United States Patent
Nakamura (10) Patent No.: US 7,639,574 B2
(45) Date of Patent: Dec. 29, 2009

(54) OPTICAL PICKUP

(75) Inventor: Hiroki Nakamura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 613 days.

(21) Appl. No.: 11/165,195

(22) Filed: Jun. 24, 2005

(65) Prior Publication Data

US 2005/0285022 A1    Dec. 29, 2005

(30) Foreign Application Priority Data

Jun. 25, 2004 (JP) ............. P.2004-188654

(51) Int. Cl.
*G11B 7/00* (2006.01)

(52) U.S. Cl. ............ 369/44.37; 250/216; 369/44.41; 369/44.23

(58) Field of Classification Search ........... 369/112.01, 369/44.41, 44.11, 44.23, 44.37; 250/116
See application file for complete search history.

(56) References Cited

U.S. PATENT DOCUMENTS

| | | | | |
|---|---|---|---|---|
| 6,049,518 | A * | 4/2000 | Tsuchiya et al. | 369/112.02 |
| 6,385,158 | B1 * | 5/2002 | Takagi et al. | 369/112.16 |
| 6,643,245 | B2 * | 11/2003 | Yamamoto et al. | 369/112.01 |
| 6,822,771 | B2 * | 11/2004 | Funato et al. | 359/15 |
| 7,443,780 | B2 * | 10/2008 | Yukawa | 369/112.12 |
| 7,564,765 | B2 * | 7/2009 | Murakami | 369/112.1 |
| 2003/0007436 | A1 * | 1/2003 | Komma et al. | 369/53.2 |
| 2004/0042358 | A1 * | 3/2004 | Ito | 369/44.37 |
| 2006/0082145 | A1 * | 4/2006 | Steveley | 285/305 |

FOREIGN PATENT DOCUMENTS

| | | |
|---|---|---|
| CN | 1264899 A | 8/2000 |
| CN | 1499501 A | 5/2004 |
| JP | 199773017 | 3/1997 |
| JP | 9-326127 | 12/1997 |
| JP | 2001-216677 | 8/2001 |
| JP | 200391857 | 3/2003 |
| JP | 200495115 | 3/2004 |

* cited by examiner

*Primary Examiner*—Wayne R Young
*Assistant Examiner*—Linh T Nguyen
(74) *Attorney, Agent, or Firm*—Morgan, Lewis & Bockius LLP (57) ABSTRACT

An optical pickup including: a monolithic laser light-emitting unit for emitting a first laser beam and a second laser beam having mutually different wavelengths; an one-sided spectrally separating unit for spectrally separating the first laser beam and the second laser beam; a polarizing unit for allowing the laser beam passed through the one-sided spectrally separating unit to be introduced to an optical disk side and for reflecting reflected light from the optical disk; an astigmatism unit for imparting astigmatism to the reflected light; and a photodetecting unit in which a first laser reflected light-receiving portion is arranged in such a manner as to be offset from a second laser reflected light-receiving portion, wherein an optical system is constructed such that a long-axis direction of an ellipse indicating a light spot on the optical disk becomes oblique with respect to a tracking direction.

7 Claims, 10 Drawing Sheets

TRACKING DIRECTION

PRIOR ART

FIG. 13

PRIOR ART

PRIOR ART

OPTICAL PICKUP

BACKGROUND OF THE INVENTION

1. Field of the Invention

The present invention relates to an optical pickup provided in an optical disk recording/reproducing apparatus for effecting the recording and/or reproduction of information with respect to an optical disk such as a compact disk (CD) and a digital versatile disk (DVD), and more particularly to the construction of an optical system in the optical pickup.

2. Description of the Related Art

Figure 11:
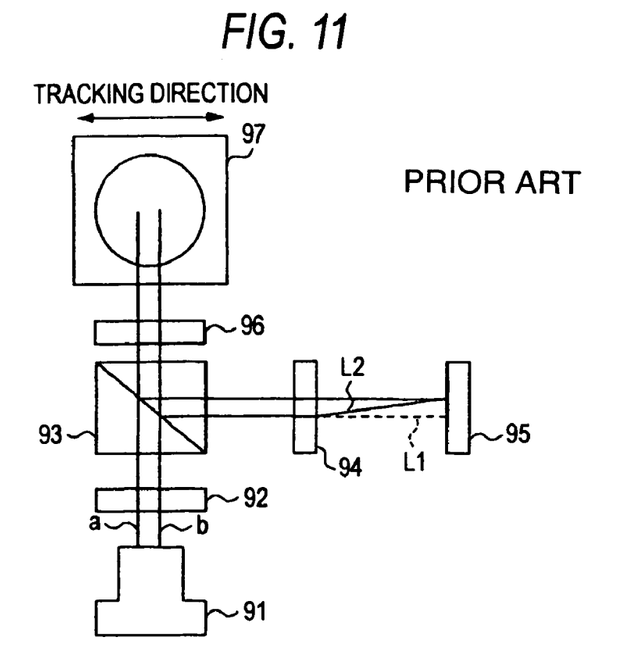
FIG. 11 is a diagram schematically illustrating the construction of an optical system in a first conventional optical pickup.

FIG. 11 is a diagram schematically illustrating the construction of an optical system in a first conventional optical pickup. The optical system of this optical pickup includes a two-wavelength hybrid laser diode 91, a two-wavelength double-sided diffractive element 92, a polarizing beam splitter 93, an optical axis correcting element 94, a photodetector 95, a quarter wavelength plate 96, an upper mirror 97, and the like.

The two-wavelength hybrid laser diode 91 uses two semiconductor chips, is mounted on an unillustrated mounting base, and is adapted to emit a laser beam a for CD and a laser beam b for DVD separately from the respective semiconductor chips. Since the two-wavelength hybrid laser diode 91 is mounted on the mounting base, the positional accuracy between the semiconductor chips is set stringently, but a situation can occur in which if positional offset occurs, the optical axis changes.

The laser beam (the laser beam a for CD or the laser beam b for DVD) emitted from the two-wavelength hybrid laser diode 91 is passed through the two-wavelength double-sided diffractive element 92, the polarizing beam splitter 93, and the quarter wavelength plate 96. The laser beam is then projected upwardly by the upper mirror 97, is passed through an unillustrated objective lens, and is applied to a track on the optical disk. Then, the applied laser beam is reflected from the optical disk, is made incident upon and reflected by the polarizing beam splitter 93 through the upper mirror 97 and the quarter wavelength plate 96, is passed through the optical axis correcting element 94, and is made incident upon the photodetector 95.

Figure 12:
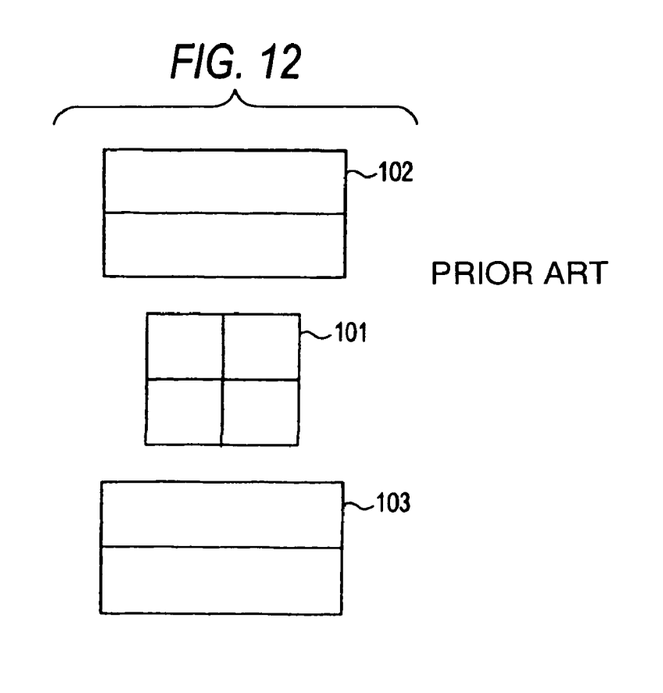
FIG. 12 is a diagram illustrating the shape of the light-receiving surface of a photodetector in the first conventional optical pickup.

The optical axis correcting element 94 corrects the optical axis of the reflected beam from the polarizing beam splitter 93 directed in the direction indicated by the broken line L1, such that the optical axis of the reflected beam is set in the direction indicated by the solid line L2. The reason this optical axis correcting element 94 is required is that since the two-wavelength hybrid laser diode 91 uses two semiconductor chips, if the distance between the semiconductor chips on the mounting base has changed due to an error, the change needs to be corrected. If this optical axis correcting element 94 is used, as the photodetector 95 it is possible to use a general one which is conventionally available. However, this optical axis correcting element 94 is required for the optical system, and one extra element of the optical system is required, leading to a higher cost. The shape of the light-receiving surface of the photodetector 95 becomes as shown in FIG. 12. In FIG. 12, reference numeral 101 denotes a light-receiving portion for receiving the reflected light of a main beam, and reference numerals 102 and 103 denote light-receiving portions for receiving the reflected light of sub-beams.

Figure 13:
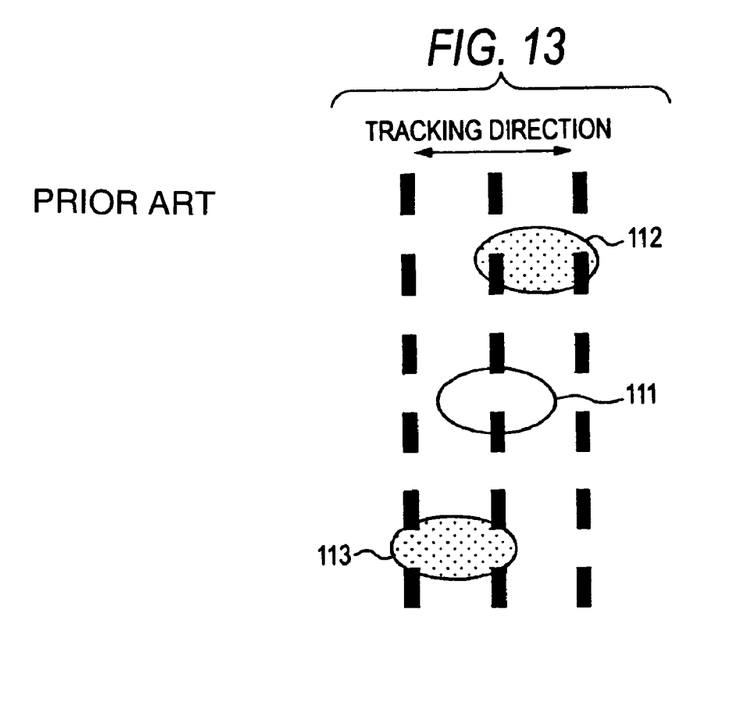
FIG. 13 is a diagram illustrating a state in which the main beam and the sub-beams are incident upon the recording surface of the optical disk with respect to the tracking direction in the first conventional optical pickup.

In addition, if the optical system having the above-described construction is adopted, the light spot of a main beam 111 and light spots of sub-beams 112 and 113 become elliptical, as shown in FIG. 13. To ensure that the main beam 111 does not undergo a positional offset from a track on the optical disk, the optical pickup is provided with a tracking actuator (not shown) for providing control such that the main beam 111 comes to the center of the track by moving the objective lens of the optical pickup in the radial direction of the optical disk. The sub-beams 112 and 113 are provided for detecting whether the main beam 111 has come to the center of the track.

The long-axis direction of the elliptical shape of the light spot of the main beam 111 or each of the light spots of the sub-beams 112 and 113 is the tracking direction. In actuality, however, infinitesimal light is present, and there are cases where a signal from an adjacent track or a nearby track is picked up, so that signal reproduction accuracy becomes inferior.

Figure 16:
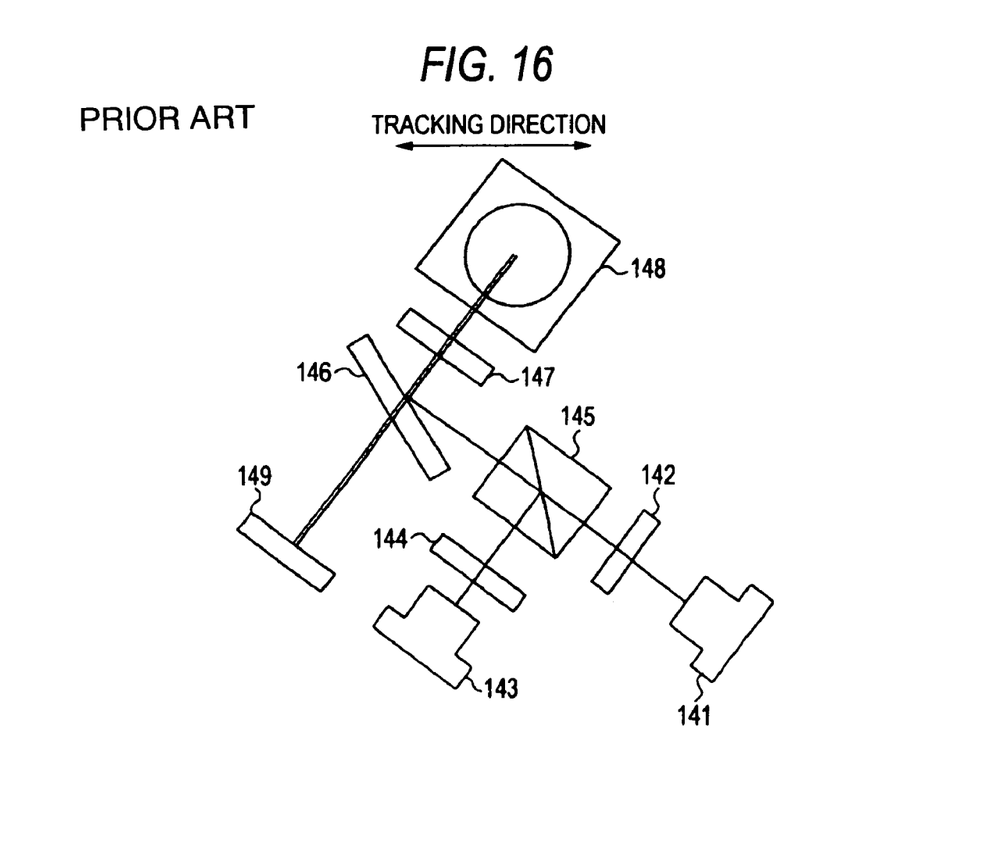
FIG. 16 is a diagram schematically illustrating the construction of the optical system in the second conventional optical pickup.

FIG. 16 is a diagram schematically illustrating the construction of the optical system in a second conventional optical pickup.

Figure 17:
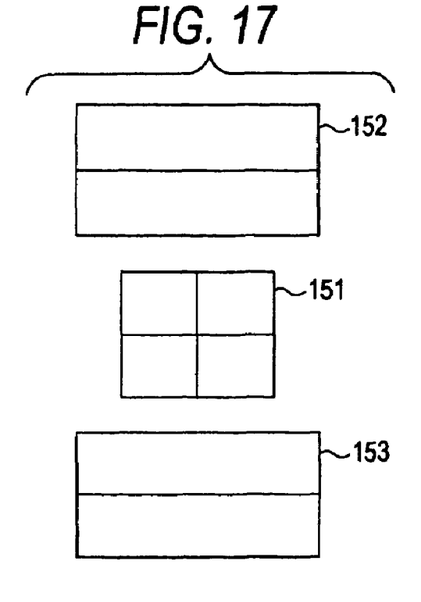
FIG. 17 is a diagram illustrating the shape of the light-receiving surface of the photodetector in the second conventional optical pickup.

The optical system of this optical pickup includes a laser diode 141 for CD, a diffractive element 142 for CD, a laser diode 143 for DVD, a diffractive element 144 for DVD, a beam splitter 145, a beam splitter 146, a quarter wavelength plate 147, an upper mirror 148, a photodetector 149, and the like. The optical pickup having such an optical system is called a bulk-type optical pickup. The shape of the light-receiving surface of the photodetector 149 becomes as shown in FIG. 17. In FIG. 17, reference numeral 151 denotes a light-receiving portion for receiving the reflected light of a main beam, and reference numerals 152 and 153 denote light-receiving portions for receiving the reflected light of sub-beams.

In the optical system of this optical pickup, since the laser diode 141 for CD and the laser diode 143 for DVD are provided separately, the optical axes of the laser beams splitter 145. Hence, the optical path leading from the beam splitter 145 can be used in common for the CD use and the DVD use. Accordingly, in the optical system of this optical pickup, the aforementioned optical axis correcting element becomes unnecessary.

Figure 18:
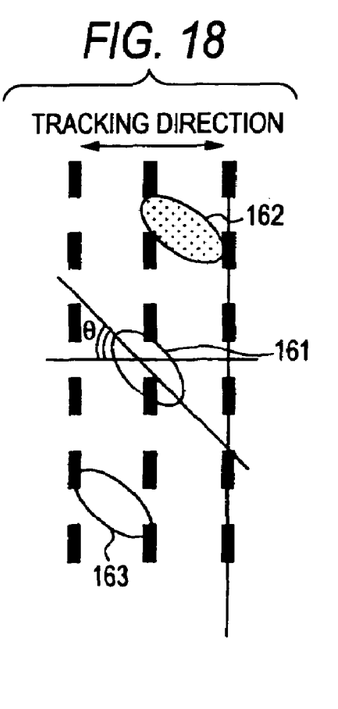
FIG. 18 is a diagram illustrating a state in which the main beam and the sub-beams are incident upon the recording surface of the optical obliquely disk with respect to the tracking direction in the second conventional optical pickup.

In the optical system of this construction, the laser beam from the laser diode 141 for CD or the laser diode 143 for DVD is incident obliquely with respect to the tracking direction. Consequently, the light spots of a main beam 161 and sub-beams 162 and 163 assume elliptical shapes in which their long axes are inclined by an angle θ with respect to the tracking direction, as shown in FIG. 18. If such a construction is provided, cases where a signal from an adjacent track or a nearby track is mixed in can be decreased, thereby making it possible to reduce noise components of the reproduction signal.

Although the performance can be improved by the optical pickup of this construction, since the laser diode 141 for CD and the laser diode 143 for DVD are provided separately, the number of optical elements increases as compared with the optical system of the above-described first conventional optical pickup. Hence, there is a tendency of increasing the cost correspondingly.

As described above, in the construction of the optical system of the first conventional optical pickup such as one shown in FIG. 11, since the two-wavelength hybrid laser diode 91 uses two semiconductor chips, the optical axis correcting element 94 is required to correct a change in the distance between the semiconductor chips on the mounting base occurring due to an error. Hence, there been a problem in that higher cost is entailed correspondingly. In addition, the long-axis direction of the elliptical shape of the light spot of the main beam 111 or each of the light spots of the sub-beams 112 and 113 is the tracking direction, as shown in FIG. 13. In actuality, however, infinitesimal light is present, and there are cases where a signal from an adjacent track or a nearby track is picked up, so that there is the problem that signal reproduction accuracy becomes inferior.

In addition, in the construction of the optical system of the second conventional optical pickup such as one shown in FIG. 16, since the laser diode 141 for CD and the laser diode 143 for DVD are provided separately, the number of optical elements increases as compared with the optical system of the above-described first conventional optical pickup. Hence, there is the problem that the cost increases correspondingly.

It should be noted that the conventional technique in JP-A-9-326127 in terms of its characteristic basic construction is included of an optical unit for applying a laser beam onto a recording surface of an optical disk having a different reproduction condition by an objective lens and for introducing the laser beam reflected by the recording surface; a polarizing-surface changeover unit for selectively changing over a polarizing direction of the laser beam to a specific direction in correspondence with the reproduction condition; and a polarization selecting unit upon which the light transmitted through the polarizing-surface changeover unit is incident and which polarizes the light in the specific direction so as to shield an outer peripheral side of the laser beam. In addition, as the optical configuration, there is provided an optical pickup using a two-wavelength hybrid laser diode such as the one described above, a bulk-type optical pickup, or an optical pickup using a two-wavelength monolithic laser diode such as the one which will be described later.

However, since the aperture of the objective lens is limited by a liquid-crystal element, the polarizing direction is perpendicular. Further, the polarizing direction is only adjusted to a horizontal direction or a perpendicular direction by adjusting the rotation of the laser diode. Since the laser beam is not made incident obliquely with respect to the tracking direction, a tilted elliptical light spot is not formed. As a result, there are cases where a signal from an adjacent track or a nearby track is mixed, so that noise components are superimposed on the reproduction signal.

In the conventional technique in JP-A-2001-216677, a multiple semiconductor laser (monolithic laser diode) is used. However, since a grating for CD (one-sided grating) and a grating for DVD (one-sided grating) are provided separately, in the same way as the construction of the case in which the aforementioned two-wavelength double-sided diffractive element is used, an optical axis correcting element is required, so that the number of elements of the optical system increases. In addition, although one-sided gratings are used, the photodetector has a light-receiving surface corresponding to the case where the optical axis correcting element is used.

It should be noted that the conventional techniques of neither JP-A-9-326127 nor JP-A-2001-216677 disclose the shape of the light-receiving surface of the photodetector in the construction in the case where the laser beam is made incident obliquely with respect to the tracking direction by using the two-wavelength one-sided diffractive element and without using the optical correcting element.

SUMMARY OF THE INVENTION

The present invention has been devised to overcome the above-described problems, and its object is to provide an optical pickup which, by using a two-wavelength monolithic laser diode, is capable of ameliorating a reduction in the power of the laser beam, effecting satisfactory recording and reproduction, and attaining a cost reduction of the optical system.

To attain the above object, in accordance with a first aspect of the invention there is provided an optical pickup for optically writing information on an optical disk and optically reading the information recorded on the optical disk, including: a two-wavelength monolithic laser diode for emitting a laser beam for CD and a laser beam for DVD having mutually different wavelengths; a two-wavelength one-sided diffractive element for spectrally separating the laser beam for CD and the laser beam for DVD emitted from the two-wavelength monolithic laser diode; a polarizing beam splitter for allowing the laser beam passed through the two-wavelength one-sided diffractive element to be introduced to an optical disk side and for reflecting reflected light from the optical disk and introducing the reflected light to a photodetector side; a cylindrical lens for imparting astigmatism to the reflected light reflected by the polarizing beam splitter; and a photodetector in which a light-receiving portion for CD is arranged in such a manner as to be offset from a light-receiving portion for DVD on a light-receiving surface so as to be capable of receiving convergent light passed through the cylindrical lens, wherein an optical system is constructed such that a long-axis direction of an ellipse indicating a light spot on the optical disk becomes oblique with respect to a tracking direction, and the light-receiving portions of the photodetector are arranged on the light-receiving surface so as to match the optical system.

In this construction, when the laser beam for CD is emitted from the two-wavelength monolithic laser diode and is incident upon the two-wavelength one-sided diffractive element, the laser beam for CD is made emergent from the two-wavelength one-sided diffractive element by being spectrally separated into a main beam and two sub-beams for CD, which are then passed through the polarizing beam splitter and are applied to a recording surface of the optical disk through a predetermined optical element. This optical system is arranged such that the long-axis direction of an ellipse indicating each light spot of the main beam and the two sub beams for CD on the optical disk becomes oblique with respect to the tracking direction. Further, each reflected light of the main beam and the two sub beams for CD from the optical disk is incident upon the polarizing beam splitter through the predetermined optical element and is reflected, is further incident upon the cylindrical lens, and is converged astigmatically. This astigmatism is used for focus error detection at the time of the recording/reproduction of a CD. The converged light is incident upon the light-receiving portion for CD on the light-receiving surface of the photodetector, and is converted to an electrical signal as a reproduction signal for the CD.

In addition, when the laser beam for DVD is emitted from the two-wavelength monolithic laser diode and is incident upon the two-wavelength one-sided diffractive element, the laser beam for DVD is made emergent from the two-wavelength one-sided diffractive element by being spectrally separated into a main beam and two sub-beams for DVD, which are then passed through the polarizing beam splitter and are applied to a recording surface of the optical disk through a predetermined optical element. This optical system is arranged such that the long-axis direction of an ellipse indicating each light spot of the main beam and the two sub beams for DVD on the optical disk becomes oblique with respect to the tracking direction. Further, each reflected light of the main beam and the two sub beams for DVD from the optical disk is incident upon the polarizing beam splitter through the predetermined optical element and is reflected, is further incident upon the cylindrical lens, and is converged astigmatically. This astigmatism is used for focus error detection at the time of the recording/reproduction of a DVD. The converged light is incident upon the light-receiving portion for DVD on the light-receiving surface of the photodetector, and is converted to an electrical signal as a reproduction signal for the DVD.

According to this construction, by using the two-wavelength monolithic laser diode, the optical axis correcting element becomes unnecessary, thereby making it possible to effect a cost reduction correspondingly. In addition, as the main beam and the sub-beams are incident obliquely with respect to the tracking direction of the optical disk, it is possible to attain the improvement of recording/reproduction accuracy. In addition, since the two-wavelength one-sided diffractive element is used, the laser beam is not transmitted through an unnecessary grating. Hence, it is possible to suppress unwanted spectral separation and improve the transmittance, thereby making it possible to enhance the power of the laser beam and attain the improvement of recording/reproduction accuracy.

In accordance with a second aspect of the invention, there is provided an optical pickup for optically writing information on an optical disk and optically reading the information recorded on the optical disk, including: a monolithic laser light-emitting unit for emitting a first laser beam and a second laser beam having mutually different wavelengths; an one-sided spectrally separating unit for spectrally separating the first laser beam and the second laser beam emitted from the monolithic laser light-emitting unit; a polarizing unit for allowing the laser beam passed through the one-sided spectrally separating unit to be introduced to an optical disk side and for reflecting reflected light from the optical disk and introducing the reflected light to a photodetecting unit side; an astigmatism unit for imparting astigmatism to the reflected light reflected by the polarizing unit; and a photodetecting unit in which a first laser reflected light-receiving portion is arranged in such a manner as to be offset from a second laser reflected light-receiving portion on a light-receiving surface so as to be capable of receiving convergent light passed through the astigmatism unit, wherein an optical system is constructed such that a long-axis direction of an ellipse indicating a light spot on the optical disk becomes oblique with respect to a tracking direction, and the light-receiving portions of the photodetecting unit are arranged on the light-receiving surface so as to match the optical system.

In this construction, when the first laser beam or the second laser beam is emitted from the monolithic laser light-emitting unit and is incident upon the one-sided spectrally separating unit, the first laser beam or the second laser beam is made emergent from the one-sided spectrally separating unit by being spectrally separated into a main beam and two sub-beams, which are then passed through the polarizing unit and are applied to a recording surface of the optical disk through a predetermined optical element. This optical system is arranged such that the long-axis direction of an ellipse indicating each light spot of the main beam and the two sub beams on the optical disk becomes oblique with respect to the tracking direction. Further, each reflected light of the main beam and the two sub beams from the optical disk is incident upon the polarizing unit through the predetermined optical element and is reflected, is further incident upon the astigmatism unit, and is converged astigmatically. This astigmatism is used for focus error detection at the time of the recording/reproduction of the disk. The converged light is incident upon the light-receiving portion on the light-receiving surface of the photodetecting unit, and is converted to an electrical signal as a reproduction signal for the optical disk.

According to this construction, by using the monolithic laser light-emitting unit, the optical axis correcting element becomes unnecessary, thereby making it possible to effect a cost reduction correspondingly. In addition, as the main beam and the sub-beams are incident obliquely with respect to the tracking direction of the optical disk, it is possible to attain the improvement of recording/reproduction accuracy. In addition, since the one-sided spectrally separating unit is used, the laser beam is not transmitted through an unnecessary grating. Hence, it is possible to suppress unwanted spectral separation and improve the transmittance, thereby making it possible to enhance the power of the laser beam and attain the improvement of recording/reproduction accuracy.

In accordance with a third aspect of the invention, in the optical pickup according to the second aspect of the invention, the first laser beam is a laser beam for CD, and the second laser beam is a laser beam for DVD. Therefore, the invention is applicable to an optical pickup which is used for effecting recording/reproduction with respect to a CD and a DVD.

In accordance with a fourth aspect of the invention, in the optical pickup according to the second aspect of the invention, the monolithic laser light-emitting unit is a two-wavelength monolithic laser diode. Therefore, the two-wavelength monolithic laser diode 1 is not such that two semiconductor chips are mounted on the mounting base and the positional adjustment of the laser diodes is made, so that the positional accuracy between the first laser beam and the second laser beam improves remarkably. Consequently, it is possible to eliminate an optical axis correcting element such as the one used in the optical system of the conventional optical pickup.

In accordance with a fifth aspect of the invention, in the optical pickup according to the second aspect of the invention, the one-sided spectrally separating unit is a two-wavelength one-sided diffractive element. Therefore, the laser light is not transmitted through an unnecessary grating, so that it is possible to suppress unwanted spectral separation and improve the transmittance.

In accordance with a sixth aspect of the invention, in the optical pickup according to the second aspect of the invention, the polarizing unit is a polarizing beam splitter. Therefore, the laser beam for the optical disk can be transmitted, and the reflected light from the optical disk can be reflected.

In accordance with a seventh aspect of the invention, in the optical pickup according to the second aspect of the invention, the astigmatism unit is a cylindrical lens. Therefore, the optical axes of the reflected light of the first and second laser beams can be inclined by the curvature of the cylindrical lens surface, whereby the reflected light can be made incident upon a predetermined light-receiving portion of the photodetecting unit. In addition, as astigmatism is imparted to the reflected light, focus error detection is made possible.

As described above, in accordance with the invention, the optical pickup for optically writing information on an optical disk and optically reading the information recorded on the optical disk, includes: a two-wavelength monolithic laser diode for emitting a laser beam for CD and a laser beam for DVD having mutually different wavelengths; a two-wavelength one-sided diffractive element for spectrally separating the laser beam for CD or the laser beam for DVD emitted from the two-wavelength monolithic laser diode; a polarizing beam splitter for allowing the laser beam passed through the two-wavelength one-sided diffractive element to be introduced to an optical disk side and for reflecting reflected light from the optical disk and introducing the reflected light to a photodetector side; a cylindrical lens for imparting astigmatism to the reflected light reflected by the polarizing beam splitter; and a photodetector in which a light-receiving portion for CD is arranged in such a manner as to be offset from a light-receiving portion for DVD on a light-receiving surface so as to be capable of receiving convergent light passed through the cylindrical lens, wherein an optical system is constructed such that a long-axis direction of an ellipse indicating a light spot on the optical disk becomes oblique with respect to a tracking direction, and the light-receiving portions of the photodetector are arranged on the light-receiving surface so as to match the optical system.

Accordingly, by using the two-wavelength monolithic laser diode, the optical axis correcting element becomes unnecessary, thereby making it possible to effect a cost reduction correspondingly. In addition, as the main beam and the sub-beams are incident obliquely with respect to the tracking direction of the optical disk, it is possible to attain the improvement of recording/reproduction accuracy. In addition, since the two-wavelength one-sided diffractive element is used, the laser beam is not transmitted through an unnecessary grating. Hence, it is possible to suppress unwanted spectral separation and improve the transmittance, thereby making it possible to enhance the power of the laser beam and attain the improvement of recording/reproduction accuracy.

In addition, in accordance with the invention, the optical pickup for optically writing information on an optical disk and optically reading the information recorded on the optical disk, includes: a monolithic laser light-emitting unit for emitting a first laser beam and a second laser beam having mutually different wavelengths; an one-sided spectrally separating unit for spectrally separating the first laser beam or the second laser beam emitted from the monolithic laser light-emitting unit; a polarizing unit for allowing the laser beam passed through the one-sided spectrally separating unit to be introduced to an optical disk side and for reflecting reflected light from the optical disk and introducing the reflected light to a photodetecting unit side; an astigmatism unit for imparting astigmatism to the reflected light reflected by the polarizing unit; and a photodetecting unit in which a first laser reflected light-receiving portion is arranged in such a manner as to be offset from a second laser reflected light-receiving portion on a light-receiving surface so as to be capable of receiving convergent light passed through the astigmatism unit, wherein an optical system is constructed such that a long-axis direction of an ellipse indicating a light spot on the optical disk becomes oblique with respect to a tracking direction, and the light-receiving portions of the photodetecting unit are arranged on the light-receiving surface so as to match the optical system.

Accordingly, by using the monolithic laser light-emitting unit, the optical axis correcting element becomes unnecessary, thereby making it possible to effect a cost reduction correspondingly. In addition, as the main beam and the sub-beams are incident obliquely with respect to the tracking direction of the optical disk, it is possible to attain the improvement of recording/reproduction accuracy. In addition, since the one-sided spectrally separating unit is used, the laser beam is not transmitted through an unnecessary grating. Hence, it is possible to suppress unwanted spectral separation and improve the transmittance, thereby making it possible to enhance the power of the laser beam and attain the improvement of recording/reproduction accuracy.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
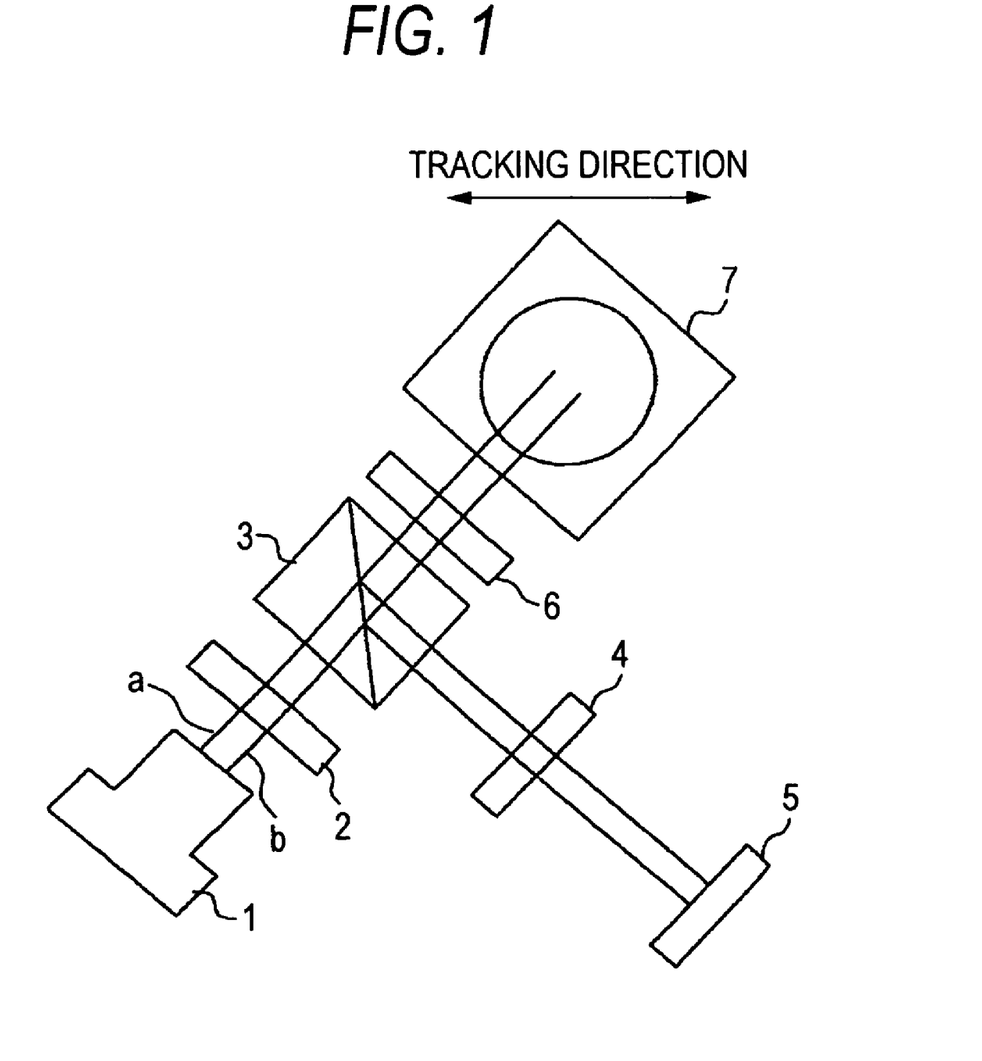
FIG. 1 is a diagram schematically illustrating the construction of an optical system in an optical pickup in accordance with an embodiment of the invention.

Referring now to the accompanying drawings, a description will be given of an embodiment of the invention. FIG. 1 is a diagram schematically illustrating the construction of an optical system in an optical pickup in accordance with the embodiment of the invention.

The optical system of this optical pickup includes a two-wavelength monolithic laser diode 1, a two-wavelength one-sided diffractive element 2, a polarizing beam splitter 3, a cylindrical lens 4, a photodetector 5, a quarter wavelength plate 6, an upper mirror 7, and the like. It should be noted that an objective lens is not shown. The two-wavelength monolithic laser diode 1 used in this optical system is a monolithic laser diode in which the semiconductor chip consists of a single chip, is mounted on an unillustrated mounting base, and emits a laser beam a for CD and a laser beam b for DVD. This two-wavelength monolithic laser diode 1 is not such that two semiconductor chips are mounted on the mounting base and the positional adjustment of the laser diodes is made, so that the positional accuracy between the laser beam a for CD and the laser beam b for DVD improves remarkably. Consequently, it is possible to eliminate an optical axis correcting element such as the one used in the optical system of the conventional optical pickup.

The two-wavelength monolithic laser diode 1, in which two laser diodes are accommodated in a single semiconductor chip, is mounted on an unillustrated mounting base, and is adapted to emit the laser beam a for CD and the laser beam b for DVD separately. Since the two-wavelength monolithic laser diode 1 is mounted on the mounting base, the positional accuracy between the laser diodes is made high and strict, but a situation can occur in which if positional offset occurs, the optical axis changes.

Incidentally, in the optical system of the conventional optical pickup shown in FIG. 11 referred to above, the laser beam (the laser beam a for CD or the laser beam b for DVD) emitted from a two-wavelength hybrid laser diode 91 is passed through a two-wavelength double-sided diffractive element 92, a polarizing beam splitter 93, and a quarter wavelength plate 96, is projected upwardly by an upper mirror 97, is passed through an unillustrated objective lens, and is applied to a track on the optical disk. Then, the applied laser beam is reflected from the optical disk, is made incident upon and reflected by the polarizing beam splitter 93 through the upper mirror 97 and the quarter wavelength plate 96, is passed through an optical axis correcting element 94, and is made incident upon a photodetector 95.

In the optical system of the optical pickup shown in FIG. 11, in the case where the optical axis correcting element 94 is eliminated, the reflected light of the laser beam b for DVD is made incident upon the photodetector 95 in an optical path indicated by the broken line L1. Therefore, even if a light-receiving surface is provided on the photodetector 95 so as to be adjusted thereto, accuracy in the positional adjustment between the semiconductor chip for CD and the semiconductor chip for DVD of the two-wavelength hybrid laser diode 91 is inferior. Therefore, even if the shape of the light-receiving surface is formed as shown in FIG. 2, it has hitherto been impossible to properly receive the reflected light of the laser beam.

Figure 6:
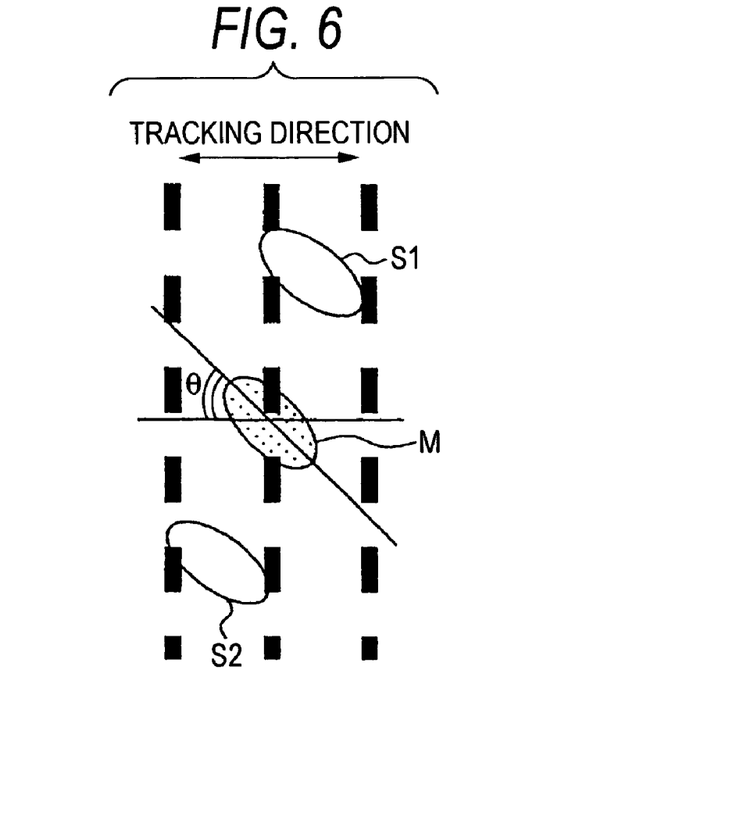
FIG. 6 is a diagram illustrating a state in which the main beam and the sub-beams are incident upon a recording surface of the optical disk obliquely with respect to a tracking direction in the embodiment.
Figure 7:
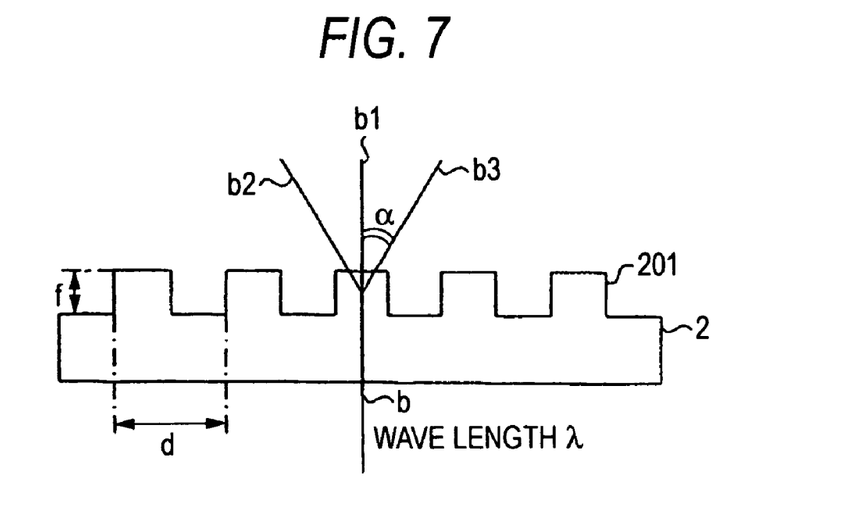
FIG. 7 is a diagram illustrating the relationship among the pitch of a grating for CD-DVD use of a two-wavelength one-sided diffractive element, an angle between the DVD-use main beam and sub-beams, and the wavelength of the beam in the embodiment.

Accordingly, in this embodiment, instead of the two-wavelength hybrid laser diode, a two-wavelength monolithic laser diode is used to eliminate the optical axis correcting element. In addition, in this embodiment, an attempt is made to improve reproduction accuracy by making a main beam M and sub-beams S1 and S2 incident obliquely upon the recording surface of the optical disk, as shown in FIG. 6.

Figure 2:
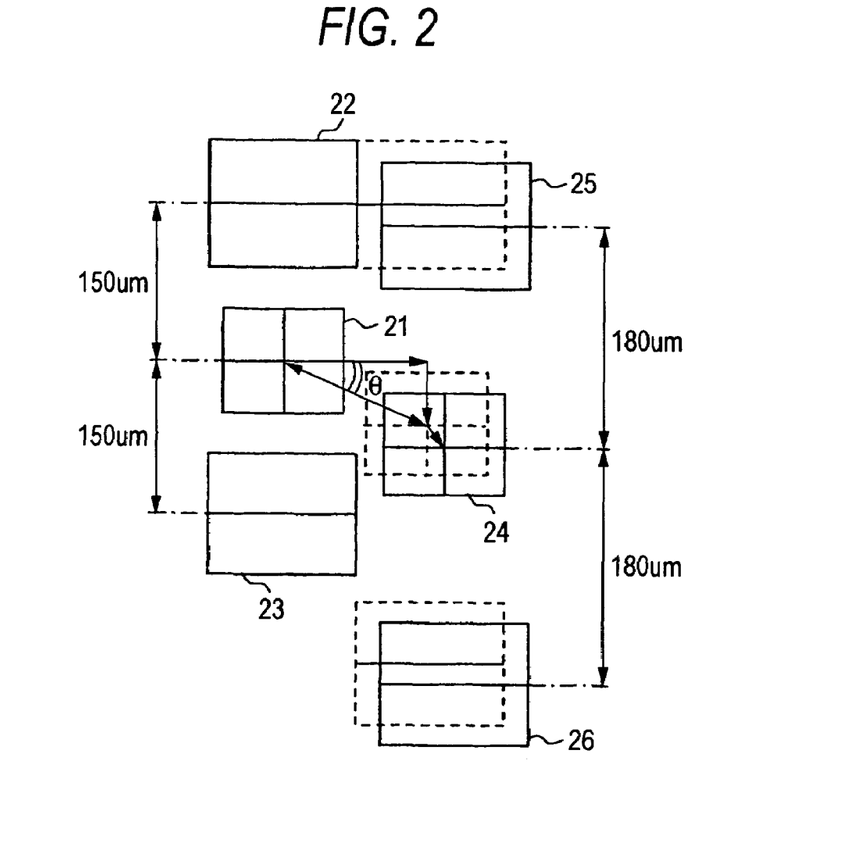
FIG. 2 is a diagram illustrating the shape of a light-receiving surface of a photodetector in the optical pickup in accordance with the embodiment.

In this embodiment, the light-receiving surface of the photodetector 5 has a shape such as the one shown in FIG. 2. In FIG. 2, reference numeral 21 denotes a DVD-side main beam reflected-light receiving portion; 22 and 23 denote DVD-side sub-beam reflected-light receiving portions; 24 denotes a CD-side main beam reflected-light receiving portion; and 25 and 26 denote CD-side sub-beam reflected-light receiving portions. The interval between the DVD-side main beam reflected-light receiving portion 21 and the sub-beam reflected-light receiving portion 22 or 23 is, for example, 150 μm, while the interval between the CD-side main beam reflected-light receiving portion 24 and the sub-beam reflected-light receiving portion 25 or 26 is, for example, 180 μm.

Figure 4:
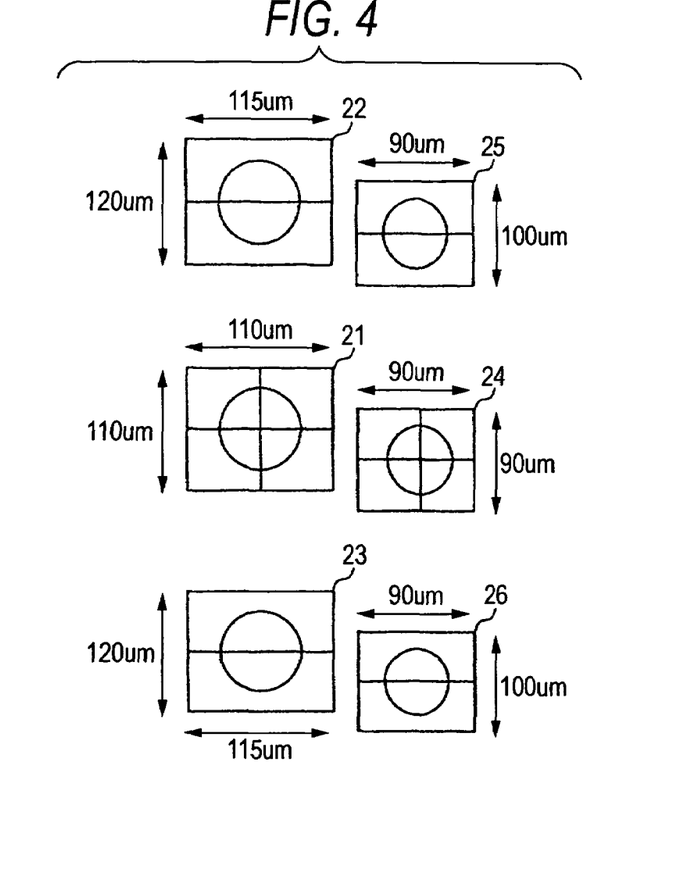
FIG. 4 is a diagram corresponding to FIG. 2 and illustrating detailed positional relationships between the light-receiving portion for the reflected light of the main beam on the DVD side and the light-receiving portions for the reflected light of the sub-beams on the CD side.
Figure 5:
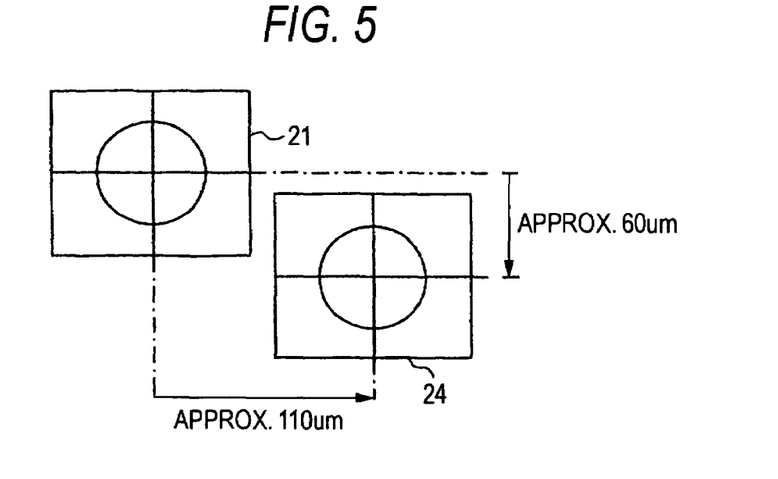
FIG. 5 is a diagram illustrating the positional relationship between the light-receiving portion for the reflected light of a main beam on the DVD side and the light-receiving portion for the reflected light of the sub-beam on the CD side in FIG. 4.

More specifically, as shown in FIG. 4, on the DVD side, the longitudinal and transverse lengths of the main beam reflected-light receiving portion 21 are 110 μm, and the longitudinal and transverse lengths of the sub-beam reflected-light receiving portions 22 and 23 are 120 μm and 115 μm, respectively. On the CD side, the longitudinal and transverse lengths of the main beam reflected-light receiving portion 24 are 90 μm, and the longitudinal and transverse lengths of the sub-beam reflected-light receiving portions 25 and 26 are 100 μm and 90 μm, respectively.

Figure 3:
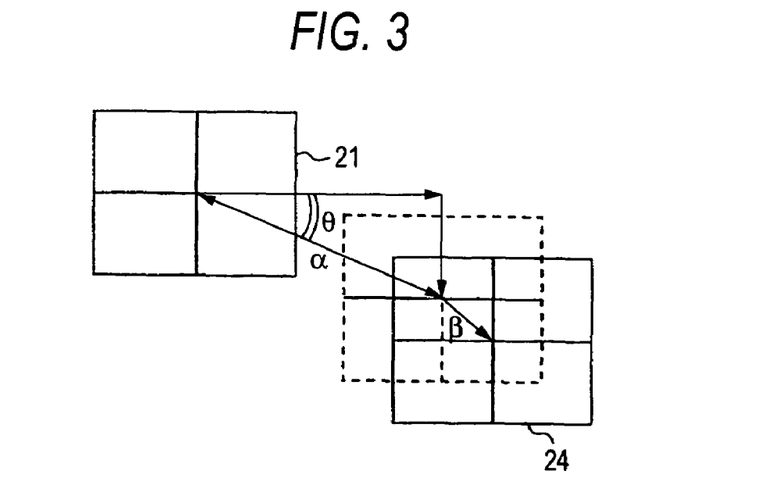
FIG. 3 is a diagram illustrating a positional relationship between a light-receiving portion for the reflected light of a main beam on a DVD side and a light-receiving portion for the reflected light of a sub-beam on a CD side in FIG. 2.

In addition, as shown in FIG. 3, the CD-side main beam reflected-light receiving portion 24 is located at a position where it is moved $\alpha\alpha\cdot\cos\theta\theta+\beta\beta\cdot\cos 45°$ in the X direction and $\alpha\cdot\sin\theta+\beta\cdot\sin 45°$ in the Y direction. Here, α denotes the interval between a DVD-side light emitting point and a CD-side light emitting point; β denotes the misalignment of the optical axis due to the cylindrical lens 4 in the return path; and θ denotes an inclination (see FIG. 6) with respect to a tracking direction in the elliptical direction (long axis direction of the ellipse) of the light spot on the optical disk.

Figures 10A, 10B:
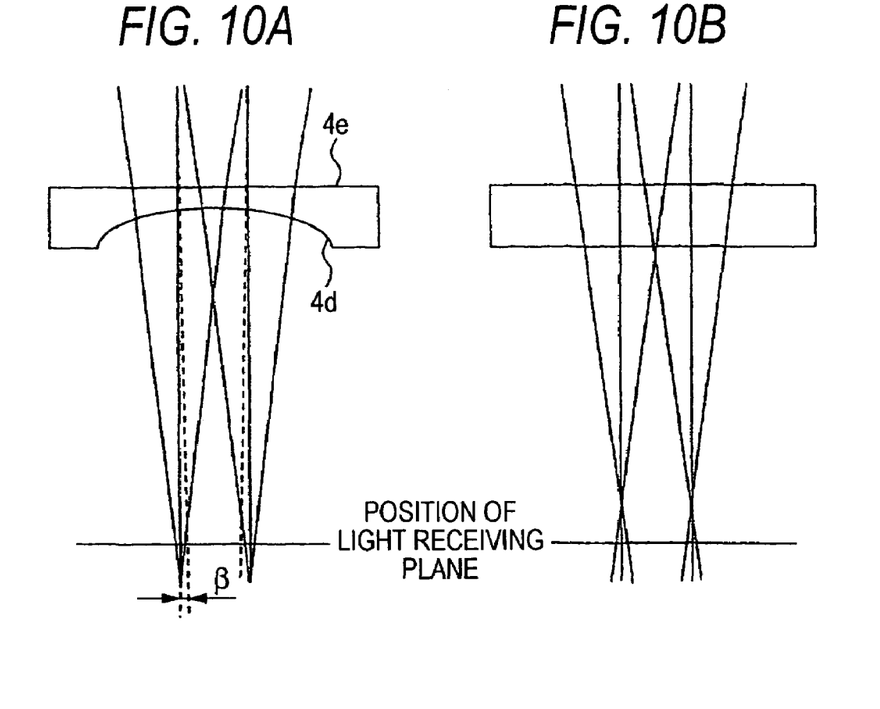
FIGS. 10A to 10C are diagrams explaining the shape of a cylindrical lens in the embodiment.
Figure 10C:
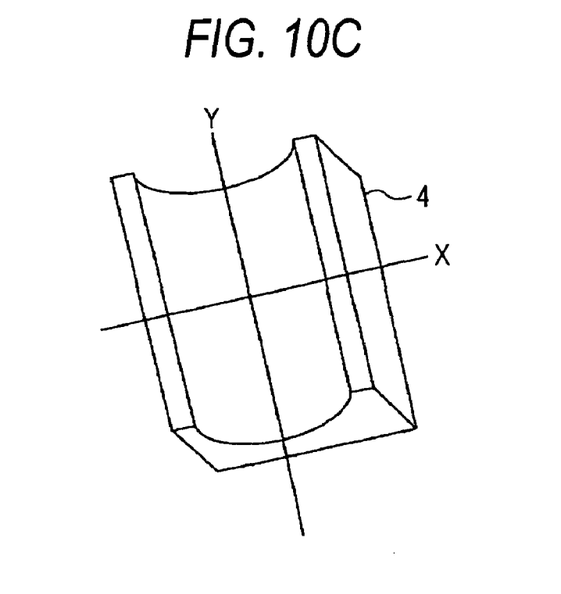

The cylindrical lens 4 has a shape in which a portion of a cylinder is cut, as shown in FIG. 10C. FIG. 10A shows the shape of the cylindrical lens 4 as viewed from a cross-sectional line X shown in FIG. 10C. FIG. 10B shows the shape of the cylindrical lens 4 as viewed from a cross-sectional line Y shown in FIG. 10C. This cylindrical lens 4 imparts astigmatism to the reflected light from the optical disk for the purpose of focus error detection. As shown in FIG. 10A, astigmatism is imparted by a concave surface 4d, and the rays of light are refracted such that the optical axes of the convergent rays move away from each other in directions perpendicular to generating lines of the cylindrical lens. In addition, in the cylindrical lens 4, an unillustrated grating is formed on a surface 4e, as shown in FIG. 10A, and is thereby constructed 50 as to be able to demonstrate its action as the optical axis correcting element.

By using this cylindrical lens 4, the focusing positions are varied on the axes. FIG. 10A shows a state in which the laser beam on the cross-sectional line X (X axis) is focused on the lower side, as viewed in the drawing, than the position of the light-receiving plane. FIG. 10B shows a state in which the laser beam on the cross-sectional line Y (Y axis) is focused on the upper side, as viewed in the drawing, than the position of the light-receiving plane.

Figure 14:
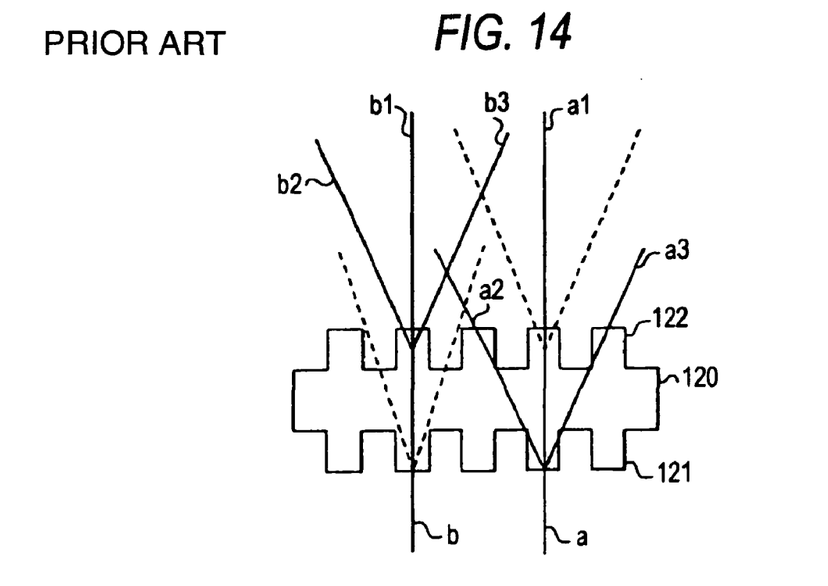
FIG. 14 is a diagram explaining the construction of a two-wavelength double-sided diffractive element in the first conventional optical pickup.

A two-wavelength double-sided diffractive element 120 which is used in the above-described conventional optical pickup has a construction such as the one shown in FIG. 14. In FIG. 14, in the two-wavelength double-sided diffractive element 120, a grating 121 for CD is formed on one side, while a grating 122 for DVD is formed on the other side. The laser beam a for CD is spectrally separated into three beams including a main beam a1 and sub-beams a2 and a3 by the grating 121 for CD, while the laser beam b for DVD is spectrally separated into three beams including a main beam b1 and sub-beams b2 and b3 by the grating 122 for DVD. When the laser beam b having a wavelength for DVD use is incident, the grating 122 for DVD spectrally separates that laser beam b into the three beams including the main beam b1 and the sub-beams b2 and b3. Accordingly, when the laser beam having a wavelength other than that for DVD use (laser beam a for CD) is incident, ideally it suffices if the grating 122 for DVD transmits all the laser beam a. In actuality, however, there are slight light components which are spectrally separated in the manner shown by the broken line.

Conversely, when the laser beam a having a wavelength for CD use is incident, the grating 121 for CD spectrally separates that laser beam a into the three beams including the main beam a1 and the sub-beams a2 and a3. When the laser beam having a wavelength other than that for CD use (laser beam b for DVD) is incident, it suffices if the grating 121 for CD transmits all the laser beam b. In actuality, however, there are slight light components which are spectrally separated in the manner shown by the broken line.

In the two-wavelength double-sided diffractive element 120, the positions of the sub-beams on the light-receiving surface of the photodetector can be controlled by such as the grating pitch and the interval between the grating for CD and the grating for DVD. Further, spectral ratios for CD and DVD can be set individually. However, since the laser beam is transmitted through the two gratings, the laser beam is spectrally separated unnecessarily as shown by the broken lines, so that the transmittance deteriorates as a whole.

Figure 8:
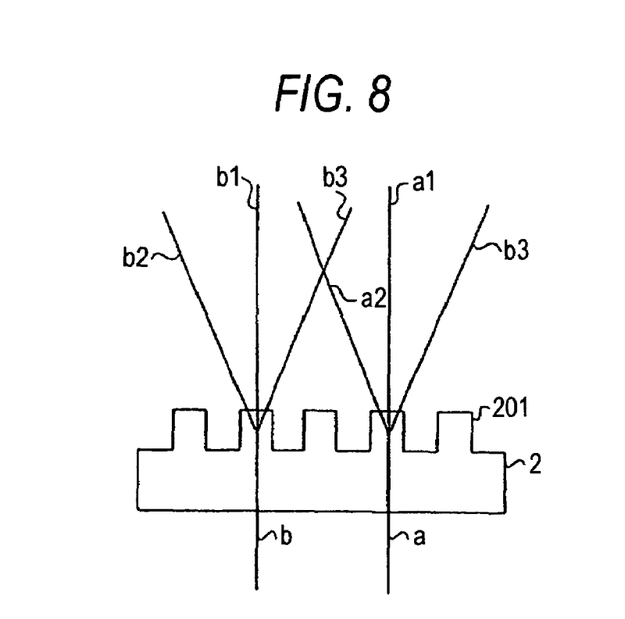
FIG. 8 is a diagram explaining the construction of the two-wavelength one-sided diffractive element in the embodiment.

If the two-wavelength one-sided diffractive element 2 such as the one shown in FIG. 8 is used to improve this situation, since the spectral separation of the laser beam a for CD or the spectral separation of the laser beam b for DVD is effected by a grating 201 for CD-DVD use, which is one and the same grating, the positions of the sub-beams at the light-receiving surface of the photodetector differ between the CD side and the DVD side owing to an angular difference of primary light in the laser beam of each wavelength. In addition, since one and the same grating is used, if the spectral ratio for DVD is once set, the spectral ratio for CD is automatically determined, and unnecessary spectral separation does not occur, so that the transmittance improves.

The reason for the improvement of the transmittance is that if it is assumed that the wavelength λ of the laser beam b for DVD is 660 nm, while the pitch of the grating 201 for CD-DVD use is d and the angle between the main beam b1 and each of the sub-beams b2 and b3 of the laser beam b for DVD is α, then the relational expression d·sin α=λ holds. In addition, the ratio among the main beam b1 and the sub-beams b2 and b3 can be set. For instance, by varying the depth f of the grating, a setting can be provided such that the light intensity of the sub-beam:the light intensity of the main beam:the light intensity of the sub-beam 1:10:1, or such that the light intensity of the sub-beam:the light intensity of the main beam:the light intensity of the sub-beam=1:20:1. Theoretically, (ideally), it suffices if the light intensity of the sub-beam:the light intensity of the main beam:the light intensity of the sub-beam=1:∞:1, but this is difficult to realize.

On the other hand, in the two-wavelength double-sided diffractive element 120 described with reference to FIG. 14, a setting is provided by the grating 121 for CD such that, for example, the light intensity of the sub-beam:the light intensity or the main beam:the light intensity of the sub-beam=1: 7:1. Further, a setting is provided by the grating 122 for DVD such that, for example, the light intensity of the sub-beam:the light intensity of the main beam:the light intensity of the sub-beam=1:20:1. If such settings are provided, since the two-wavelength double-sided diffractive element 120 uses two gratings, the laser beam is transmitted through an unnecessary grating, so that the transmittance declines.

In contrast, in the case of the two-wavelength one-sided diffractive element 2, since the unnecessary grating does not transmit the light, the pitch d and the depth f of the grating are set to values which substantially satisfy the aforementioned ratio of the light intensity in the two-wavelength double-sided diffractive element 120 with respect to both laser beams for CD and DVD use. Accordingly, in the two-wavelength one-sided diffractive element 2, the light is not transmitted through the unnecessary grating, the transmittance improves.

Figure 15:
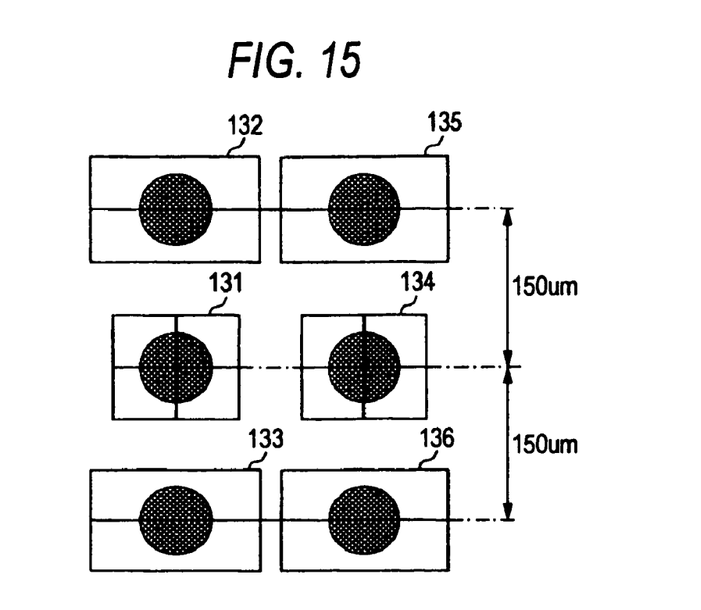
FIG. 15 is a diagram illustrating the shape of the light-receiving surface of a photodetector in a second conventional optical pickup.

It should be noted that the reason the conventional optical pickup uses the two-wavelength double-sided diffractive element and does not use the two-wavelength one-sided diffractive element is as follows: Provided on the light-receiving surface of the photodetector are a light-receiving portion 131 for the reflected light of the DVD-side main beam and light-receiving portions 132 and 133 for the reflected light of the DVD-side sub-beams, as well as a light-receiving portion 134 for the reflected light of the CD-side main beam and light-receiving portions 135 and 136 for the reflected light of the CD-side sub-beams, these light-receiving portions being arranged as shown in FIG. 15, for example. The diffraction angle of the laser beam for CD and the diffraction angle of the laser beam for DVD can be set individually by the two-wavelength double-sided diffractive element so that the reflected light of the respective beams can be received by the light-receiving portions thus arranged. Meanwhile, since the two-wavelength one-sided diffractive element uses one grating, if the pitch of the grating is once determined on the DVD side, the angle of spectral separation is automatically determined, and the reflected light of the laser beam for CD fails to reach a predetermined light-receiving portion. For these reasons, the two-wavelength double-sided diffractive element 120 is used in the conventional optical pickup.

Accordingly, since the transmittance is inferior, the light transmission efficiency is poor. In a case where information is recorded on a DVD by using such an optical pickup, an apparatus is known in which recording can be effected at 4× speed or 8× speed. However, such an apparatus is similar to one in which double speed and the quantity of light from the objective lens are proportional. As such, if the transmittance of the two-wavelength double-sided diffractive element 120 is inferior, the power of the laser beam declines until the laser beam emitted from the laser diode reaches the objective lens. Hence, it becomes necessary to increase the optical output of the laser diode, which leads to a higher cost. For this reason, if an attempt is made to decrease the optical output of the laser diode and increase the optical output from the objective lens, the transmittance of the two-wavelength double-sided diffractive element must inevitably be increased. Therefore, two-wavelength one-sided diffractive element 2 is used in this embodiment.

It should be noted that the grating for CD-DVD use of the two-wavelength one-sided diffractive element 2 is similar to the portion of the grating for DVD of the two-wavelength double-sided diffractive element, but the depth of the grating differs therefrom. The grating for DVD on the two-wavelength double-sided diffractive element is adapted to transmit almost 100% of the laser beam for CD. In the grating for CD-DVD use of the two-wavelength one-sided diffractive element, however, the laser beam must be diffracted at a ratio close to the aforementioned one when the laser beam for CD is incident. Therefore, the depth of the grating is appropriately selected so that a setting can be provided at a ratio close to that ratio.

Figure 9:
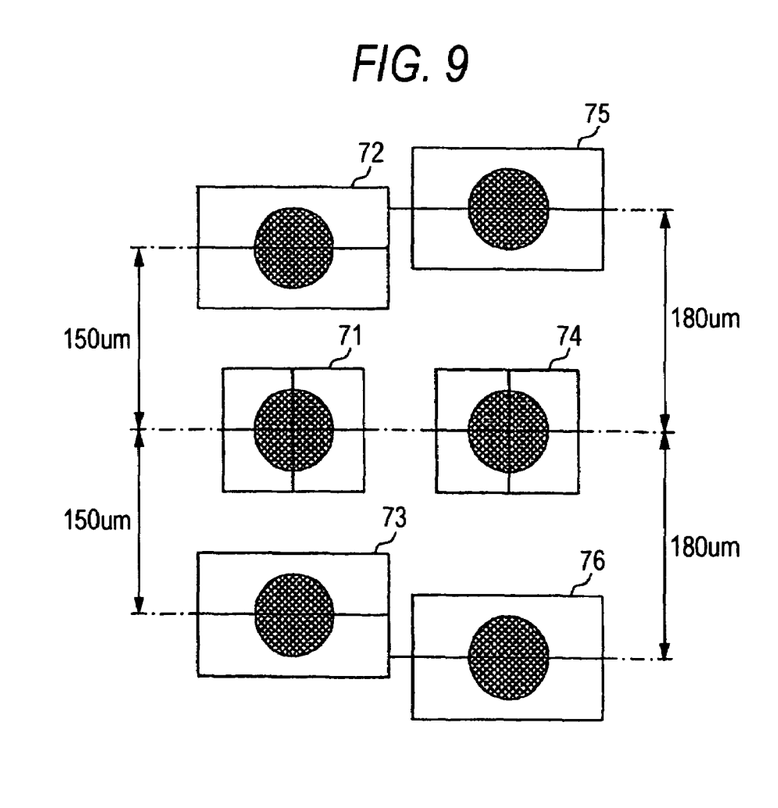
FIG. 9 is a diagram explaining that the positions of the light-receiving portions of the reflected light of the sub-beams are offset from the position of the light-receiving portion of the reflected light of the main beam on the light-receiving surface of the photodetector in the embodiment.

FIG. 9 is a diagram illustrating the light-receiving surface of the photodetector in this embodiment. Reference numeral 71 denotes a DVD-side main beam reflected-light receiving portion; 72 and 73 denote DVD-side sub-beam reflected-light receiving portions; 74 denotes a CD-side main beam reflected-light receiving portion; and 75 and 76 denote CD-side sub-beam reflected-light receiving portions. The interval between the DVD-side main beam reflected-light recording portion 71 and the sub-beam reflected-light receiving portion 72 or 73 is, for example, 150 µm, while the interval between the CD-side main beam reflected-light recording portion 74 and the sub-beam reflected-light receiving portion 75 or 76 is, for example, 150 µm. The reason the arrangement of the CD-side sub-beam reflected-light receiving portions 75 and 76 is offset from the arrangement of the DVD-side sub-beam reflected-light receiving portions 72 and 73 is to allow the cylindrical lens to be used.

Since the spectral separation of the laser beam a for CD or the spectral separation of the laser beam b for DVD is effected by the two-wavelength one-sided diffractive element 2 shown in FIG. 8, the positions of the light-receiving portions for the reflected light of the sub-beams differ between the CD side and the DVD side with respect to the positions of the light-receiving portions for the reflected light of the main beam owing to the angular difference of primary light in the laser beam of each wavelength, as described with reference to FIG. 9. Accordingly, in this embodiment, as shown in FIG. 1, the optical system is constructed such that the two-wavelength one-sided diffractive element 2 is used, and the two-wavelength monolithic laser diode 1 is used. Further, a conventional optical axis correcting element is eliminated, and the cylindrical lens 4 is alternatively used so that the long-axis direction of the ellipse becomes oblique on the optical disk. The light-receiving portions of the photodetector 5 which match this optical system are arranged as shown in FIG. 9.

As described above, according to this embodiment, by axis correcting element becomes unnecessary, thereby making it possible to effect a cost reduction correspondingly. In addition, as the main beam and the sub-beams are incident obliquely with respect to the tracking direction of the optical disk, it is possible to attain the improvement of recording/reproduction accuracy. In addition, since the two-wavelength one-sided diffractive element 2 is used, the laser beam is not transmitted through an unnecessary grating. Hence, it is possible to suppress unwanted spectral separation and improve the transmittance, thereby making it possible to enhance the power of the laser beam and attain the improvement of recording/reproduction accuracy.

What is claimed is:

1. An optical pickup for optically writing information on an optical disk and optically reading the information recorded on the optical disk, comprising:
   a two-wavelength monolithic laser diode for emitting a laser beam for CD and a laser beam for DVD having mutually different wavelengths;
   a two-wavelength one-sided diffractive element for spectrally separating the laser beam for CD and the laser beam for DVD emitted from the two-wavelength monolithic laser diode;
   a polarizing beam splitter for allowing the laser beam passed through the two-wavelength one-sided diffractive element to be introduced to an optical disk side and for reflecting reflected light from the optical disk and introducing the reflected light to a photodetector side;
   a cylindrical lens for imparting astigmatism to the reflected light reflected by the polarizing beam splitter; and
   a photodetector in which a light-receiving portion for CD is arranged in such a manner as to be offset from a light-receiving portion for DVD on a light-receiving surface so as to be capable of receiving convergent light passed through the cylindrical lens, wherein:
   an optical system is constructed such that a long-axis direction of an ellipse indicating a light spot on the optical disk becomes oblique with respect to a tracking direction, and the light-receiving portions of the photodetector are arranged on the light-receiving surface so as to match the optical system;
   the light-receiving portion for CD includes a CD-side main beam reflected-light receiving portion and a CD-side sub-beam reflected-light receiving portion;
   the light-receiving portion for DVD includes a DVD-side main beam reflected-light receiving portion and a DVD-side sub-beam reflected-light receiving portion;
   an interval between the DVD-side main beam reflected-light receiving portion and the DVD-side sub-beam reflected-light receiving portion is shorter than an interval between the CD-side main beam reflected-light receiving portion and the CD-side sub-beam reflected-light receiving portion;
   a size of the CD-side main beam reflected-light receiving portion is smaller than a size of the CD-side sub-beam reflected-light receiving portion;
   a size of the DVD-side main beam reflected-light receiving portion is smaller than a size of the DVD-side sub-beam reflected-light receiving portion; and
   the CD-side main beam reflected-light receiving portion is disposed at a position moved $\alpha \cdot \cos \theta + \beta \cdot \cos 45°$ in an X direction and $\alpha \cdot \sin \theta + \beta \cdot \sin 45°$ in a Y direction in relation to the DVD-side main beam reflected-light receiving portion wherein $\alpha$ is the interval between a DVD-side light emitting point and a CD-side light emitting point and $\beta$ is a misalignment of the optical axis due to the cylindrical lens in a return path.

2. The optical pickup according to claim 1, wherein the first laser beam is a laser beam for CD, and the second laser beam is a laser beam for DVD.

3. An optical pickup for optically writing information on an optical disk and optically reading the information recorded on the optical disk, comprising:
   a monolithic laser light-emitting unit for emitting a first laser beam and a second laser beam having mutually different wavelengths;
   an one-sided spectrally separating unit for spectrally separating the first laser beam and the second laser beam emitted from the monolithic laser light-emitting unit;
   a polarizing unit for allowing the laser beam passed through the one-sided spectrally separating unit to be introduced to an optical disk side and for reflecting reflected light from the optical disk and introducing the reflected light to a photodetector side;
   an astigmatism unit for imparting astigmatism to the reflected light reflected by the polarizing unit; and
   a photodetecting unit in which a first laser reflected light-receiving portion is arranged in such a manner as to be offset from a second laser reflected light-receiving portion on a light-receiving surface so as to be capable of receiving convergent light passed through the astigmatism unit, wherein an optical system is constructed such that a long-axis direction of an ellipse indicating a light spot on the optical disk becomes oblique with respect to a tracking direction, and the light-receiving portions of the photodetector are arranged on the light-receiving surface so as to match the optical system;

the first laser reflected light-receiving portion includes a first main beam reflected-light receiving portion and a first sub-beam reflected-light receiving portion;

the second laser reflected light-receiving portion includes a second main beam reflected-light receiving portion and a second sub-beam reflected-light receiving portion;

an interval between the second main beam reflected-light receiving portion and the second sub-beam reflected-light receiving portion is shorter than an interval between the first main beam reflected-light receiving portion and the first sub-beam reflected-light receiving portion;

a size of the first main beam reflected-light receiving portion is smaller than a size of the first sub-beam reflected-light receiving portion;

a size of the second main beam reflected-light receiving portion is smaller than a size of the second sub-beam reflected-light receiving portion; and the first main beam reflected-light receiving portion is disposed at a position moved $\alpha \cdot \sin\theta + \beta \cdot \sin 45°$ in an X direction and $\alpha \cdot \sin\theta + \beta \cdot \sin 45°$ in a Y direction in relation to the second main beam reflected-light receiving portion, wherein $\alpha$ is the interval between a second light emitting point and a first light emitting point and $\beta$ is a misalignment of the optical axis due to the astigmatism unit in a return path.

4. The optical pickup according to claim 3, wherein the monolithic laser light-emitting unit is a two-wavelength monolithic laser diode.

5. The optical pickup according to claim 3, wherein the one-sided spectrally separating unit is a two-wavelength one-sided diffractive element.

6. The optical pickup according to claim 3, wherein the polarizing unit is a polarizing beam splitter.

7. The optical pickup according to claim 3, wherein the astigmatism unit is a cylindrical lens.

* * * * *